US008346245B2

(12) United States Patent
Potkonjak

(10) Patent No.: US 8,346,245 B2
(45) Date of Patent: Jan. 1, 2013

(54) WIRELESS COMMUNICATION OBSTACLES FOR IMPROVING WIRELESS COMMUNICATIONS

(75) Inventor: Miodrag Potkonjak, Los Angeles, CA (US)

(73) Assignee: Empire Technology Development LLC, Wilmington, DE (US)

( * ) Notice: Subject to any disclaimer, the term of this patent is extended or adjusted under 35 U.S.C. 154(b) by 721 days.

(21) Appl. No.: 12/487,670

(22) Filed: Jun. 19, 2009

(65) Prior Publication Data
US 2010/0323731 A1 Dec. 23, 2010

(51) Int. Cl.
*H04W 24/00* (2009.01)
*H04W 4/00* (2009.01)
*H04M 1/00* (2006.01)

(52) U.S. Cl. ..... 455/424; 455/425; 455/423; 455/522.1; 455/550.1

(58) Field of Classification Search ............... 455/456.1, 455/457, 67.6, 423, 424, 425, 422.1
See application file for complete search history.

(56) References Cited

U.S. PATENT DOCUMENTS

| | | | | |
|---|---|---|---|---|
| 5,771,449 | A * | 6/1998 | Blasing et al. | 455/422.1 |
| 6,018,647 | A * | 1/2000 | Fitzgerald | 455/135 |
| 6,070,071 | A * | 5/2000 | Chavez et al. | 455/422.1 |
| 6,259,506 | B1 * | 7/2001 | Lawandy | 349/193 |
| 6,259,924 | B1 * | 7/2001 | Alexander et al. | 455/456.2 |
| 6,359,587 | B1 * | 3/2002 | Sugiura et al. | 342/457 |
| 6,549,772 | B1 * | 4/2003 | Chavez et al. | 455/422.1 |
| 6,963,754 | B2 * | 11/2005 | Masuda et al. | 455/522 |
| 7,055,107 | B1 * | 5/2006 | Rappaport et al. | 715/848 |
| 2003/0134654 | A1 * | 7/2003 | Masuda et al. | 455/522 |
| 2004/0023652 | A1 * | 2/2004 | Shah et al. | 455/426.2 |
| 2006/0045054 | A1 * | 3/2006 | Utsumi et al. | 370/338 |

FOREIGN PATENT DOCUMENTS

| | | |
|---|---|---|
| WO | 02/25506 A1 | 3/2002 |
| WO | 2006/053215 A2 | 5/2006 |

OTHER PUBLICATIONS

Kedar Rudre; MH-WiFiRe: Multi Hop Extension to WiFiRe; Master of Technology Thesis; Computer Science and Engineering Department, Indian Institute of Technology, Bombay; Jul. 2008; p. 1-31.
Notification of Transmittal of the International Search Report and the Written Opinion of the International Searching Authority, Aug. 11, 2010.
http://whatis.techtarget.com/definition/0,,sid9_gci1214679,00.html.
http://gizmodo.com/gadgets/gadgets/naturalnano-develops-cellphoneblocking-paint-157991.php.
http://www.naturalnano.com/index.php?option=com_content&task=view&id=109&Itemid=196.
International Preliminary Report on Patentability for International Application No. PCT/US2010/037559, Dec. 20, 2011.

* cited by examiner

*Primary Examiner* — Tilahun B Gesesse
(74) *Attorney, Agent, or Firm* — Ren-Sheng International

(57) ABSTRACT

The present disclosure generally relates to methods for improving wireless communications. Example embodiments include placing a wireless communication obstacle at an optimal or approximately optimal position to improve one or more characteristics of a wireless communication link between two wireless communication devices. The wireless communication obstacle may be adapted to absorb or reflect one or more wireless communications from other wireless communication devices to prevent and/or reduce interference with the wireless communication link between the two wireless communication devices.

24 Claims, 5 Drawing Sheets

WIRELESS COMMUNICATION OBSTACLES FOR IMPROVING WIRELESS COMMUNICATIONS

BACKGROUND

Communication techniques have been proposed, evaluated, and deployed to avoid or reduce the interference between two or more communication signals. For example, time division, frequency division, and code division multiplexing of signals organize transmissions in such a way that simultaneously transmitted signals use disjointed time intervals, disjointed frequency ranges, or are subject to multiplication with orthogonal signals.

Additionally, communication in many wireless systems is organized using the concept of cells. Signals in one cell use low power signals that minimally interfere with signals in other cells. The communication between the cells is conducted using a network infrastructure that operates using either optical fiber or different broadcast frequency ranges. While this technique is highly effective in sparsely populated areas, there are numerous technical difficulties when applied in densely populated places, such business headquarters, convention centers, hotels, universities, and sports facilities.

Interestingly, in the last two decades, controlled interference between wireless signals has emerged as a powerful technique for increasing wireless bandwidth, while at the same time keeping the emitted power constant through the concept of multiple input multiple output (MIMO) wireless communication systems.

BRIEF DESCRIPTION OF THE DRAWINGS

The foregoing and other features of the present disclosure will become more fully apparent from the following description and appended claims, taken in conjunction with the accompanying drawings. These drawings depict only several embodiments in accordance with the disclosure and are, therefore, not to be considered limiting of its scope. The disclosure will be described with additional specificity and detail through use of the accompanying drawings.

In the drawings.

DETAILED DESCRIPTION

Figure 1:
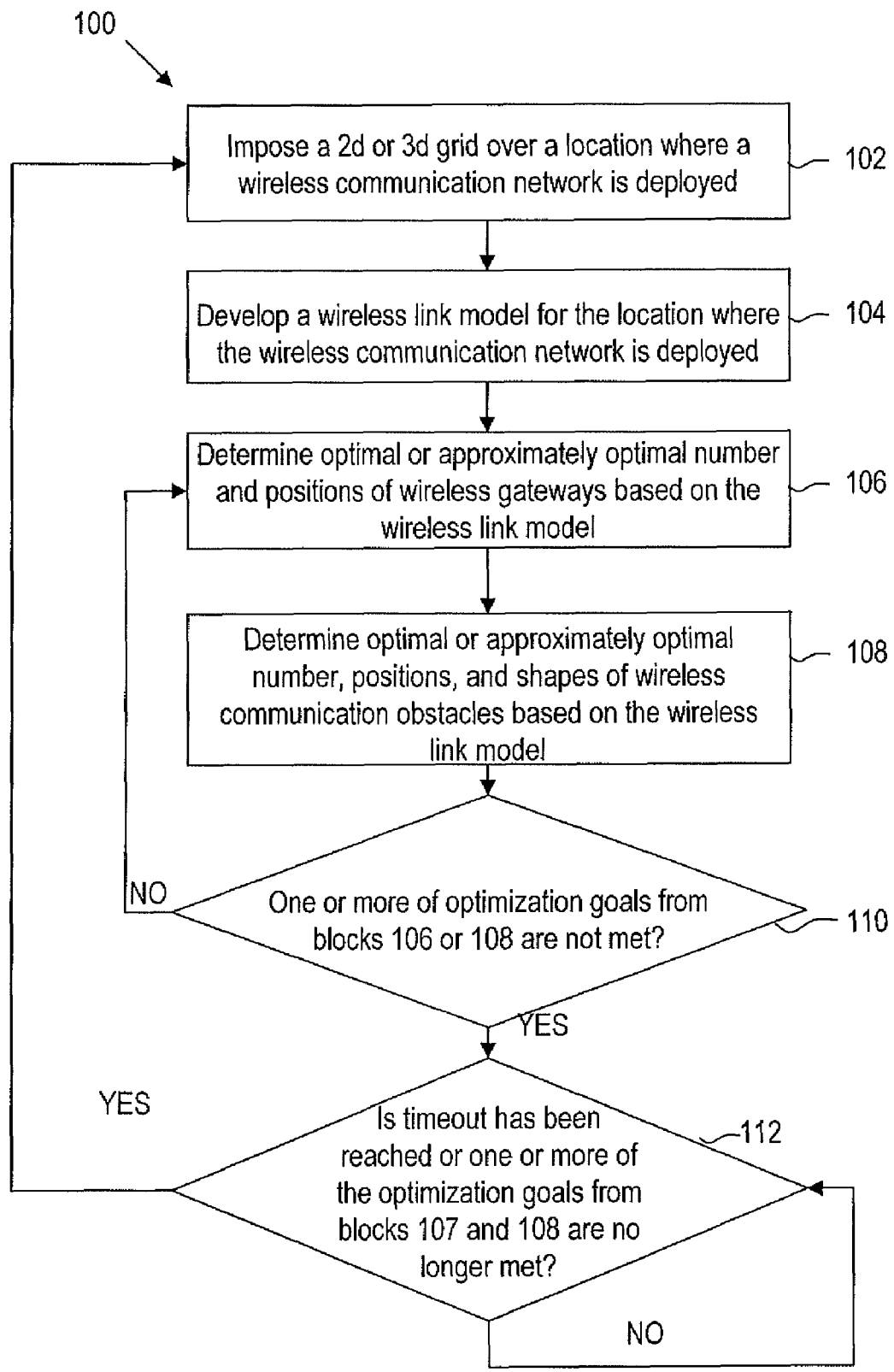
FIG. 1 is a flowchart of an example method for improving one or more characteristics of wireless communications between wireless communication devices in a wireless communication network deployed at a location by adding one or more wireless communication obstacles.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

This disclosure is generally drawn, inter alia, to methods, apparatus, computer programs, and systems related to improving wireless communications between wireless communication devices.

Embodiments of the present disclosure relate generally to adding one or more wireless communication obstacles to improve wireless communications between wireless communication devices in a wireless communication network. Wireless communication obstacles may absorb or reflect communication signals to prevent interference between temporally, frequency-wise, and/or location-wise close signals. By adding the wireless communication obstacles, multiple communication signals may be simultaneously communicated with reduced interference.

In one or more embodiments of the present disclosure, a wireless communication network may be deployed over a location. The wireless communication network may include two or more wireless communication devices and one or more wireless communication obstacles. The wireless communication devices may communicate by radio or optical signals. The wireless communication devices may be one or more wireless user devices and one or more wireless gateways. A wireless user device may be mobile or stationary. A wireless user device may include, without limitation, a mobile phone, a personal digital assistant (PDA), a laptop computer with a wireless adapter, and a personal game console with a wireless adapter. A wireless gateway may be a network device that routes packets from one wireless communication device to another device or another network through a wireless or a wired communication link. The other network may be a local area network, a campus area network, a metropolitan area network, a wide area network, or a world-wide network such as the Internet. A wireless communication obstacle may be any object that is configured to absorb, reflect, or otherwise disrupt communication signals generated by the wireless communication devices. The wireless communication object may be treated with a material that absorbs or reflects communication signals. The absorptive or reflective material may be a nanopaint, such as might be available from NaturalNano, Inc. of Rochester, N.Y. The wireless communication object may include, without limitation, a wall, a wireless gateway, or any object with its surfaces treated with the nanopaint.

FIG. 1 is a flowchart of an example method 100 for improving one or more characteristics of wireless communications between wireless communication devices in a wireless communication network deployed at a location by adding one or more wireless communication obstacles in accordance with at least some embodiments of the present disclosure. The wireless communication devices may be one or more wireless user devices and one or more wireless gateways. Method 100 includes one or more operations, functions, or actions illustrated by blocks 102, 104, 106, 108, 110, and/or 112. Certain calculation intensive blocks may be performed by a computer or a similarly configured processor. Processing for method 100 may begin at block 102

In block 102, a 2-dimentional (2D) or 3-dimentional (3D) grid may be imposed over the location where the wireless communication network is deployed. The grid may be used in a later block to define the possible positions of the wireless gateways and the wireless communication obstacles. The grid resolution may be predetermined or received from an external source. The grid resolution may determine the time needed to optimize or approximately optimize the positions of the wireless gateways and the wireless communication obstacles since a finer grid resolution leads to greater number of combinations of positions. Block 102 may be followed by block 104.

In block 104, a wireless link model is developed for the location where the wireless communication network is deployed. The wireless link model may be based on one or more statistical models for representative environments similar to the location. The representative environments may include, without limitation, an office building, a hotel lobby, a showroom, a large conference room, an open area, and a forest. A statistical model of a representative environment may be built by collecting wireless communication data from a variety of numbers of wireless communication devices placed at a variety of positions. The wireless communication data may include, without limitation, bandwidth, throughput or reception rate, and/or transmission power. Large amount data may be collected to build the statistical model or a smaller sample of data may be collected and applied to the representative environment based on certain assumptions. Block 104 may be followed by block 106.

In block 106, optimal or approximately optimal number and positions of the wireless gateways may be determined based on the wireless link model, and the resulting wireless gateways are placed into positions. Various optimization techniques may be used, including, without limitation, iterative improvement and simulated annealing, linear programming, convex programming, and non-linear programming. To determine the number and the positions of the wireless gateways, optimization goals may be set for the wireless gateways. The optimization goals may include, without limitation, a minimum bandwidth for a wireless user device at any position, a minimum throughput for a wireless user device at any position, a minimum distance between a wireless user device at any position and the closest wireless gateway, and/or fault tolerance protection that may guarantee a wireless user device at any position may communicate with multiple wireless gateways. The positions of the wireless gateways may be optimized for a predetermined number of wireless gateways, or the number of wireless gateway may be received from an external source in block 106. Block 106 may be followed by block 108.

In block 108, optimal or approximately optimal number, positions, and shapes of the wireless communication obstacles may be determined based on the wireless link model, and the resulting wireless communication obstacles are placed into positions. Various optimization techniques may be used, including, without limitation, integer linear programming and/or non-linear programming. To determine the number, the positions, and the shapes of the wireless communication obstacles, optimization goals are set for the wireless communication obstacles. The optimization goals may include, without limitation, a minimum bandwidth, a minimum throughput, and/or a maximum transmission power. The wireless communication obstacle shapes may be selected from a set of predetermined shapes. The positions of the wireless communication obstacles may be optimized for a predetermined number of wireless communication obstacles, or the number of wireless communication obstacles may be received from an external source. Block 108 may be followed by block 110.

In block 110, method 100 may determine if one or more of the optimization goals from blocks 106 and 108 are not met. The optimization goals of blocks 106 and 108 may be checked against data collected from the wireless communication network. If one or more of the optimization goals of blocks 106 and 108 are not met, then block 110 may loop back to block 106 to repeat the optimizations. In this loopback, the number of the wireless gateways may be increased, the number of the wireless communication obstacles may be increased, and/or the optimization goals may be lowered. If the optimization goals of blocks 106 and 108 are met, block 110 may be followed by block 112.

In block 112, method 100 may determine if a timeout has been reached or if one or more of the optimization goals of blocks 106 and 108 are no longer met. If either or both conditions are met, block 112 may be followed by block 102 so method 100 may be repeated. Otherwise block 112 may loop back to itself.

FIGS. 2 to 5 illustrate example locations with various wireless communication obstacles in accordance with at least some embodiments of the present disclosure. FIGS. 2 to 5 demonstrate how wireless communications may be improved by the wireless communication obstacles. The number and the position of the wireless gateways and the wireless communication obstacles, and/or the shape of the wireless communication obstacles, may be determined by method 100 described above.

Figure 2:
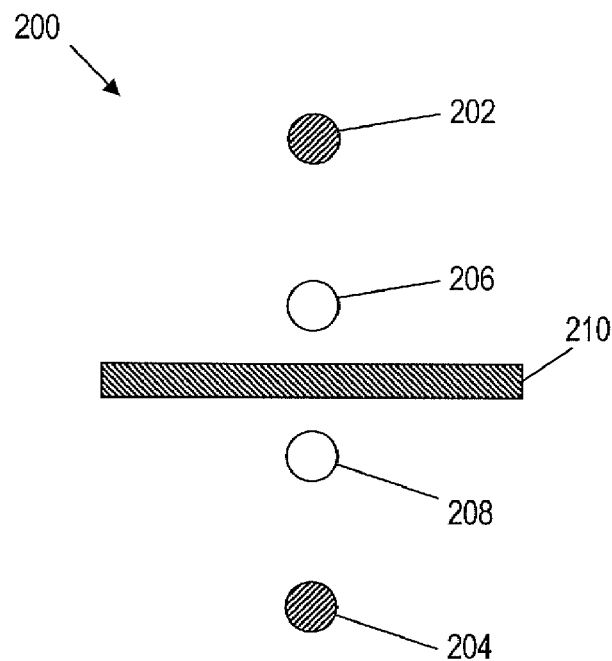
FIG. 2 illustrates an example location with a linear wireless communication obstacle.

FIG. 2 illustrates an example location 200 with a linear wireless communication obstacle 210 arranged in accordance with at least some embodiments of the present disclosure. Location 200 may include a wireless user device 202 and a wireless gateway 206 on one side of wireless communication obstacle 210, and a wireless user device 204 and a wireless gateway 208 on the other side of wireless communication obstacle 210. Wireless communication obstacle 210 may be a linear wall covered with nanopaint to absorb or reflect communication signals.

In traditional communication schemes, one wireless user device may communicate with one wireless gateway when the wireless user devices and the wireless gateways at a location use temporally, frequency-wise, and/or location-wise close communication signals. Wireless user device 202 may communicate with wireless gateway 206 while wireless device 204 may simultaneously communicate with wireless gateway 208 because wireless communication obstacle 210 may prevent or reduce interference between the two pairs of devices. As the two pairs of devices may communicate simultaneously, wireless communication obstacle 210 may, in some examples, double the bandwidth of wireless communications compared to those of traditional communication schemes.

Figure 3:
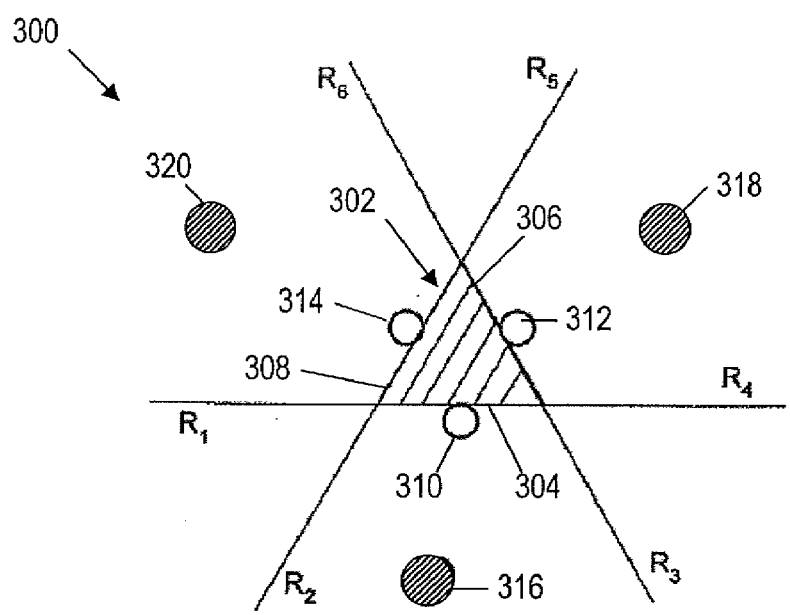
FIG. 3 illustrates an example location with a polygonal wireless communication obstacle.

FIG. 3 illustrates an example location 300 with a polygonal wireless communication obstacle 302 arranged in accordance with at least some embodiments of the present disclosure. Polygonal wireless communication obstacle 302 may have walls 304, 306, and 308 that join to form a triangular structure. A region R1 may be defined by the virtual extension of walls 304 and 308, a region R2 may be defined by wall 304 and the virtual extension of walls 306 and 308 beyond wall 304, a region R3 may be defined by the virtual extension of walls 304 and 306, a region R4 may be defined by wall 306 and the virtual extension of walls 304 and 308 beyond wall 306, a region R5 may be defined by the virtual extension of walls 306 and 308, and a region R6 may be defined by wall 308 and the virtual extension of walls 304 and 306 beyond wall 308. Location 300 may include a wireless gateway 310 located close to and positioned about wall 304 in region R2, a wireless gateway 312 located close to and positioned about wall 306 in region R4, a wireless gateway 314 located close to and positioned about wall 308 in region R6, a wireless user device 316 in region R2, a wireless user device 318 in region R4, and a wireless user device 320 in region R6. Polygonal wireless communication obstacle 302 may be covered with nanopaint to absorb or reflect communication signals By placing a wireless gateway close to a wall of polygonal wireless communication obstacle 302 and a wireless user device in a region directly opposite the same wall, a pairing of the wireless gateway and the wireless user device may communicate simultaneously with similarly paired wireless gateways and wireless user devices. For example, the pairing of wireless gateway 310 and wireless user device 316 in region R2, the pairing of wireless gateway 312 and wireless user device 318 in region R4, and the pairing of wireless gateway 314 and wireless user device 320 may communicate simultaneously because polygonal wireless communication obstacle 302 prevents or reduces interference between the three pairs of devices. In any of regions R1, R3, and R5, a wireless user device may communicate with two of the wireless gateways positioned close to the walls that define the region. For example, a wireless user device in region R1 may communicate with wireless gateways 310 and 314. As the three pair of devices may communicate simultaneously, polygonal wireless communication obstacle 302 may triple the bandwidth of wireless communication compared to those of traditional communication schemes.

Figure 4:
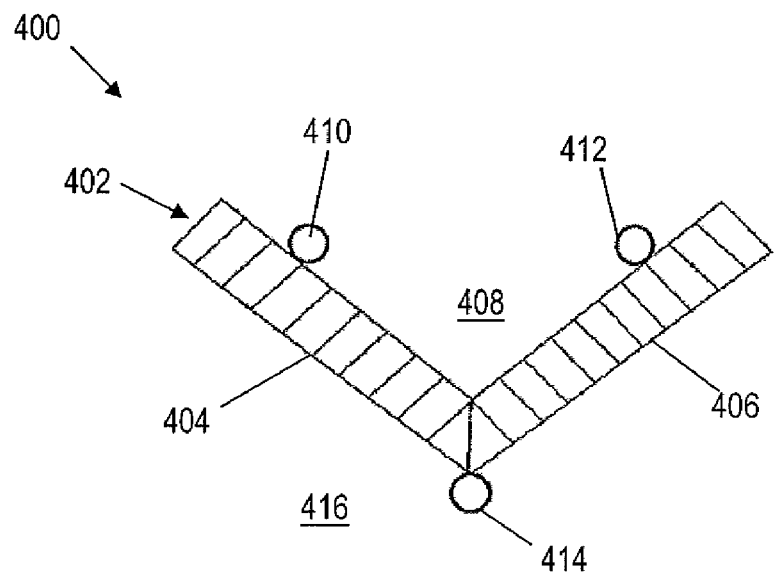
FIG. 4 is an example location with a V-shaped wireless communication obstacle.

FIG. 4 is an example location 400 with a V-shaped wireless communication obstacle 402 arranged in accordance with at least some embodiments of the present disclosure. Location 400 may include a VIP area 408 on the concave side of V-shaped wireless communication obstacle 402, an open area 416 on the convex side of V-shaped wireless communication obstacle 402, wireless gateways 410 and 412 in VIP area 408, and a wireless gateway 414 in open area 416. V-shaped wireless communication obstacle 402 may include a first wall 404 and a second wall 406 joined at an angle and painted with the nanopaint to absorb or reflect communication signals.

VIP area 408 provides an area where only a limited number of wireless communication devices may communicate. For example, a wireless user device may be located inside VIP area 408 in order to communicate with one or both of wireless gateways 410 and/or 412 because V-shaped wireless communication obstacle 402 absorbs or reflects communication signals from wireless communication devices outside of the VIP area. By absorbing or reflecting the outside communication signals, V-shape wireless communication obstacle 402 may increase the bandwidth within VIP area 408. Although VIP area 408 may also be created with a fully enclosed wireless communication obstacle (e.g., a room with four walls painted with nanopaint), V-shape wireless communication obstacle 402 may provide VIP area 408 using the minimum number of structures (i.e., two walls).

Figure 5:
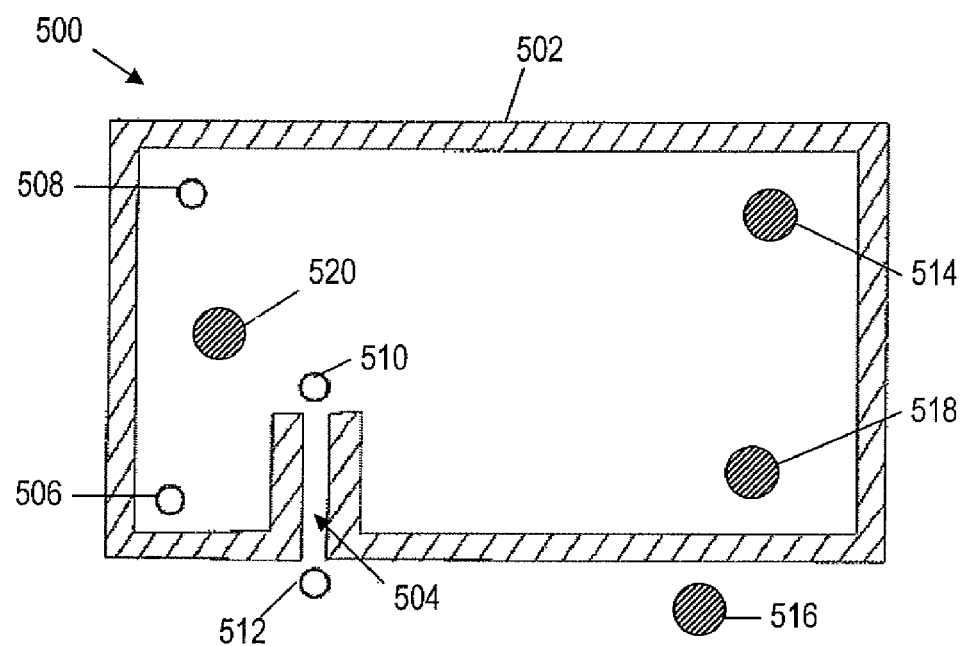
FIG. 5 is an example location using a wireless communication obstacle to create a secured wireless communication network.

FIG. 5 is an example location 500 using a wireless communication obstacle 502 to create a secured wireless communication network in accordance with at least some embodiments of the present disclosure. Location 500 may include wireless gateways 506, 508, and 510 inside an enclosed space defined by wireless communication obstacle 502, a wireless gateway 512 outside of the enclosed space, wireless user devices 514, 518, and 520 inside the enclosed space, and a wireless user device 516 outside the enclosed space. Wireless communication obstacle 502 may have walls and an entrance corridor 504. The walls of wireless communication structure 502 may be covered with nanopaint to absorb or reflect communication signals. Wireless gateways 506, 508, 512, and 510 and wireless user devices 514, 517, 518, and 520 may be adapted to form a wireless mesh network.

Wireless gateway 506 may be located at a lower left corner of the enclosed space and it may be surrounded on the east, south, and west by walls. The use of directions is illustrative and not intended to limit embodiments of the present disclosure. Wireless gateway 508 may be located at the upper left corner of the enclosed space and it may be surrounded on the west and the north by walls. Wireless gateway 510 may be located just inside of entrance corridor 504 and wireless gateway 512 may be located just outside of entrance corridor 504.

Wireless user device 514 may be located at an upper right corner of the enclosed space. Wireless user device 514 may communicate with wireless gateways 508 and 510, but not wireless gateway 506 because communication signals to and from wireless user device 514 may be blocked by the nanopainted walls around wireless gateway 506. On the other hand, wireless user device 520 may communicate with wireless gateway 506, because communication signals to and from wireless user device 520 are not blocked by the nanopainted walls around wireless gateway 506. By judiciously positioning the wireless gateways and the nanopainted walls, communications may be limited to certain wireless gateways and certain wireless user devices so that undesirable interference may be prevented or reduced.

Entrance corridor 504 and the positions of wireless gateways 510 and 512 may be configured to prevent unwanted wireless communications from entering the enclosed area. As described above, wireless gateway 510 is placed at the inner end of entrance corridor 504 and wireless gateway 512 may be placed on the outer end of entrance corridor 504. Wireless gateway 510 or 512 may include a firewall that may be configured to block unauthorized access from outside of the enclosed space. Communication signals exiting the enclosed area may be relayed from wireless gateway 510 to wireless gateway 512, and vice versa. Wireless communication devices inside the enclosed area (e.g., wireless gateway 508) may not communicate to wireless communication devices (e.g., wireless user device 516) outside the enclosed area without having their communication signals relayed from wireless gateway 510 to wireless gateway 512, and vice versa. By controlling the movement of the communication signals in and out of the enclosed area through entrance corridor 504, wireless gateway 510, and/or wireless gateway 512, a secured wireless communication network may be created at location 500.

Figure 6:
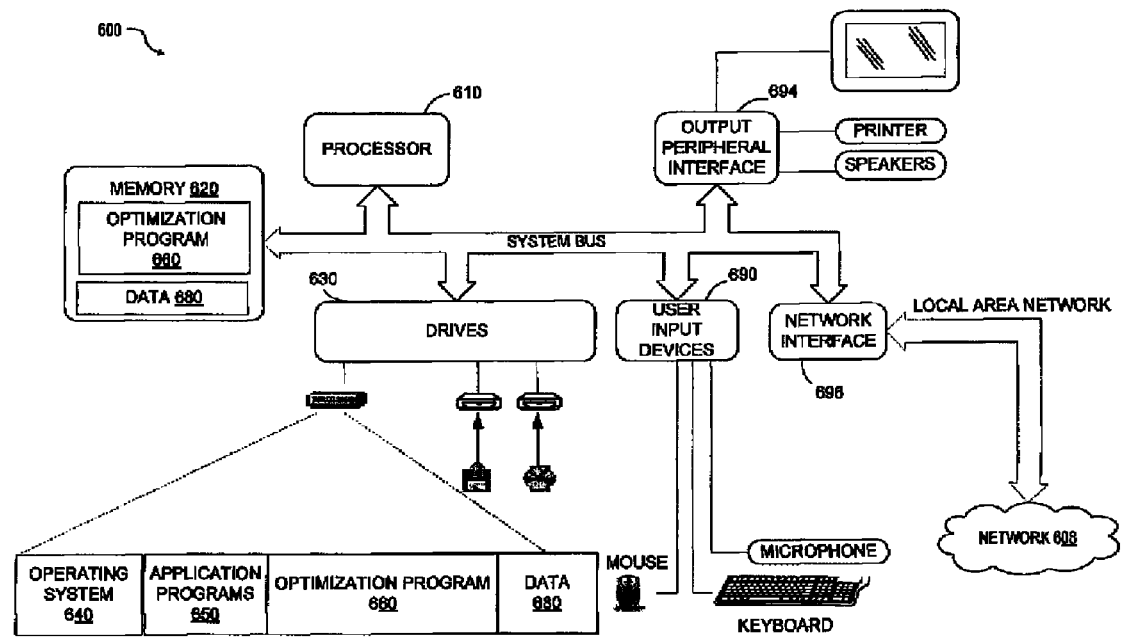
FIG. 6 is a block diagram illustrating an example computing device that is arranged for wireless communication optimization.

FIG. 6 is a block diagram illustrating an example computing device 600 that is arranged for wireless communication optimization in accordance with at least some embodiments of the present disclosure. Computing device 600 includes a processor 610, memory 620, and one or more drives 630. The drives 630 and their associated computer storage media, provide storage of computer readable instructions, data structures, program modules and other data for the computer 600. Drives 630 can include an operating system 640, application programs 650, an optimization program 660 for adding one or more wireless communication obstacles to a wireless communication network, and data 680 for optimization program 660. Processor 610 may load optimization program 660 into memory 620, execute optimization program 660 to modify data 680, and save data 680 in drives 630.

Computer 600 further includes user input devices 690 through which a user may enter commands and data. Input devices can include an electronic digitizer, a microphone, a keyboard and pointing device, commonly referred to as a mouse, trackball or touch pad. Other input devices may include a joystick, game pad, satellite dish, scanner, or the like.

These and other input devices can be connected to processor 610 through a user input interface that is coupled to a system bus, but may be connected by other interface and bus structures, such as a parallel port, game port or a universal serial bus (USB). Computers such as computer 600 may also include other peripheral output devices such as speakers, which may be connected through an output peripheral interface 694 or the like.

Computer 600 may operate in a networked environment using logical connections to one or more computers, such as a remote computer connected to network interface 696. The remote computer may be a personal computer, a server, a router, a network PC, a peer device or other common network node, and can include many or all of the elements described above relative to computer 600. Networking environments are commonplace in offices, enterprise-wide area networks (WAN), local area networks (LAN), intranets and the Internet. For example, in the subject matter of the present application, computer 600 may comprise the source machine from which data is being migrated, and the remote computer may comprise the destination machine or vice versa. Note however, that source and destination machines need not be connected by a network 608 or any other means, but instead, data may be migrated via any media capable of being written by the source platform and read by the destination platform or platforms. When used in a LAN or WLAN networking environment, computer 600 is connected to the LAN through a network interface 696 or an adapter. When used in a WAN network environment, computer 600 typically includes a modem or other means for establishing communications over the WAN, such as the Internet or network 608. It will be appreciated that other means of establishing a communications link between the computers may be used.

Figure 7:
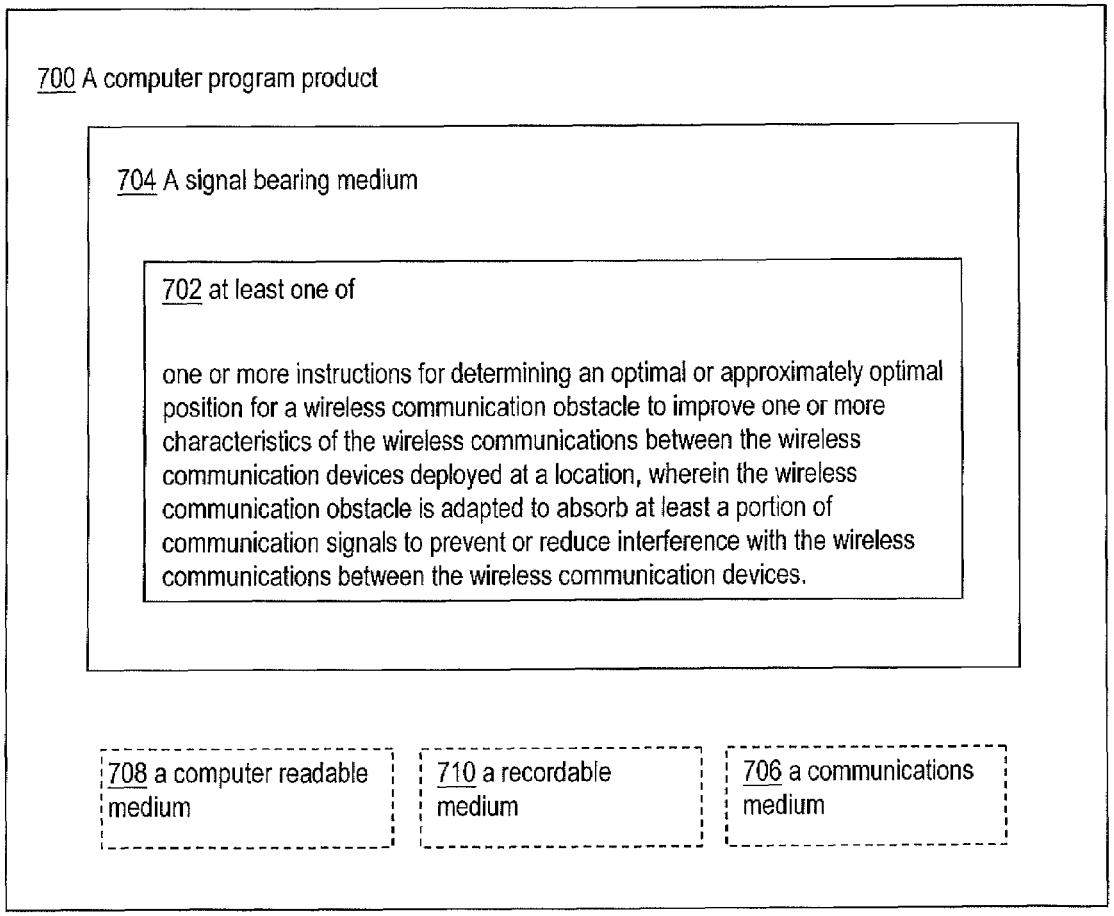
FIG. 7 is a block diagram illustrating a computer program product for a computing device, all arranged in accordance with at least some embodiments of the present disclosure.

FIG. 7 is a block diagram illustrating a computer program product 700 for a computing device in accordance with at least some embodiments of the present disclosure. Computer program product 700 may include one or more sets of instructions 702 for executing the methods of the presently disclosed multi-copy transmission schemes. Computer program product 700 may be transmitted in a signal bearing medium 704 or another similar communication medium 706. Computer program product 700 may be recorded in a computer readable medium 708 or another similar recordable medium 710.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A data processing system may be implemented utilizing any suitable commercially available components, such as those that may be found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A method for improving wireless communications between wireless communication devices in a wireless communication network deployed at a location, comprising
   collecting wireless communication data from the wireless communication devices transmitting communication signals at the location to develop one or more characteristics associated with the wireless communications; and
   placing a wireless communication obstacle at an optimal or approximately optimal position relative to the location to improve the one or more characteristics of the wireless communications between the wireless communication devices,
      wherein the wireless communication obstacle is adapted to absorb or reflect at least a portion of the communication signals to prevent and/or reduce interference with the wireless communications between the wireless communication devices.

2. The method of claim 1, further comprising
   forming the wireless communication obstacle by applying a nanopaint to a structure, wherein the nanopaint is configured to absorb or reflect the at least a portion of the communication signals.

3. The method of claim 1, wherein the one or more characteristics of the wireless communications between the wireless communication devices correspond to
   one or more of a bandwidth, a throughput of the wireless communications between the wireless communication devices, a transmission power of the wireless communications between the wireless communication devices, and/or a security of the wireless communications between the wireless communication devices.

4. The method of claim 1, wherein the wireless communication devices include a wireless gateway and a stationary or a mobile wireless user device, the method further comprising:
   developing a wireless link model for the location; and
   determining an optimal or approximately optimal position for the wireless gateway to improve either a bandwidth or a throughput of the wireless communications between the wireless gateway and the stationary or the mobile wireless user device at the location based at least in part on the wireless link model.

5. The method of claim 1, further comprising:
   developing a wireless link model for the location; and
   determining the optimal or approximately optimal position for the wireless communication obstacle and/or a shape of the wireless communication obstacle based at least in part on the wireless link model.

6. The method of claim 1, wherein the wireless communication devices include a first wireless gateway and a second wireless gateway, and the optimal or approximately optimal position corresponds to a position between the first wireless gateway and the second wireless gateway.

7. The method of claim 1, wherein the wireless communication devices include a first wireless gateway, a second wireless gateway, a first wireless user device, and a second wireless user device, the method further comprising:

placing the wireless communication obstacle to define an enclosed space; and relaying a communication signal between the first wireless user device and the first wireless gateway in the enclosed space through the second wireless gateway to the second wireless user device outside of the enclosed space.

8. The method of claim 1, further comprising:

after placing the wireless communication obstacle at the optimal or approximately optimal position, determining if the one or more characteristics of the wireless communications between the wireless devices have deteriorated; and when the one or more characteristics of the wireless communications between the wireless communication devices have deteriorated, changing the position of the wireless communication obstacle to improve the one or more characteristics of the wireless communications between the wireless communication devices.

9. The method of claim 1, wherein:

the wireless communication devices include a wireless gateway and a wireless user device; and placing the wireless communication obstacle at the optimal or approximately optimal position to create an area where the wireless gateway and the wireless user device are arranged to communicate with reduced interference from another wireless gateway in the wireless communication network.

10. The method of claim 1, wherein the wireless communication devices include a wireless gateway, and wherein placing the wireless communication obstacle at the optimal or approximately optimal position comprises applying a nanopaint to one or more surfaces of the wireless gateway.

11. A computer-readable storage medium encoded with computer-executable instructions for execution by a processor to improve wireless communications between wireless communication devices in a wireless communication network deployed at a location, the instructions comprising collecting wireless communication data from the wireless communication devices transmitting communication signals at the location to develop one or more characteristics associated with the wireless communications; and determining an optimal or approximately optimal position for a wireless communication obstacle relative to the location to improve the one or more characteristics of the wireless communications between the wireless communication devices at the location, wherein the wireless communication obstacle is adapted to absorb or reflect at least a portion of the communication signals to prevent and/or reduce interference with the wireless communications between the wireless communication devices.

12. The computer-readable storage medium of claim 11, wherein the instructions further comprise:

developing a wireless link model for the location;

wherein determining the optimal or approximately optimal position for the wireless communication obstacle is based on the wireless link model, and the one or more characteristics of the wireless communications between the wireless communication devices is either a bandwidth or a throughput of the wireless communications between the wireless communication devices.

13. The computer-readable storage medium of claim 11, wherein the wireless communication devices include a wireless gateway and a wireless user device, and the instructions further comprise determining an optimal or approximately optimal position for the wireless gateway to improve the one or more characteristics of the wireless communications between the wireless gateway and the wireless user device.

14. The computer-readable storage medium of claim 13, wherein the instructions further comprise:

developing a wireless link model for the location;

wherein determining the optimal or approximately optimal position for the wireless gateway is based on the wireless link model, and the one or more characteristics of the wireless communications between the wireless gateway and the wireless user device is one or more of bandwidth, throughput, transmission power, and/or security of the wireless communications between the wireless gateway and the wireless user device.

15. The computer-readable storage medium of claim 13, wherein the wireless user device is either mobile or stationary.

16. A device for improving wireless communication, comprising:

a memory unit; and a processor configured to determine an optimal or approximately optimal position relative to a location for a wireless communication obstacle to improve one or more characteristics of wireless communications between wireless communication devices at the location, wherein the wireless communication obstacle is adapted to absorb or reflect at least a portion of communication signals to prevent and/or reduce interference with the wireless communications between the wireless communication devices.

17. The device of claim 16, wherein the processor is further configured to:

develop a wireless link model for the location;

wherein determining the optimal or approximately optimal position for the wireless communication obstacle is based at least in part on the wireless link model, and/or the one or more characteristics of the wireless communications between the wireless communication devices, which corresponds to one or more of bandwidth and/or throughput of the wireless communications between the wireless communication devices.

18. The device of claim 16, wherein the wireless communication devices include a wireless gateway and a wireless user device, and the processor is further configured to determine an optimal or approximately optimal position for the wireless gateway relative to the location to improve one or more characteristics of the wireless communications between the wireless gateway and the wireless user device.

19. The device of claim 18, wherein the processor is further configured to:

develop a wireless link model for the location;

wherein determining the optimal or approximately optimal position for the wireless gateway is based at least in part on the wireless link model, and the one or more characteristics of the wireless communications between the wireless gateway and the wireless user device, which corresponds to one or more of bandwidth, throughput, transmission power, and/or security of the wireless communications between the wireless gateway and the wireless user device.

20. The device of claim 18, wherein the wireless user device is either mobile or stationary.

21. A wireless communication network, comprising:

wireless communication devices; and a wireless communication obstacle at an optimal or approximately optimal position that improves one or more characteristics of the wireless communications between the wireless communication devices, wherein the wireless communication obstacle is adapted to absorb or reflect one or more communication signals to prevent and/or reduce interference with the wireless communications between the wireless communication devices.

22. The wireless communication network of claim 21, wherein:
the wireless communication obstacle is a wall; and
the wireless communication devices comprise a first wireless user device and a first wireless gateway on one side of the wall, and a second wireless user device and a second wireless gateway on an other side of the wall.

23. The wireless communication network of claim 21, wherein:
the wireless communication obstacle comprises a first, second, and third walls intersecting with one another to form a triangular structure; and
the wireless communication devices comprise:
a first wireless gateway device located near the first wall;
a first wireless user device located in a first region defined by the first wall and virtual extension of the second and the third walls beyond the first wall, the first wireless user device being adapted to communicate with the first wireless gateway device;
a second wireless gateway device located near the second wall;
a second wireless user device located in a second region defined by the second wall and virtual extension of the first and the third walls beyond the second wall, the second wireless user device being adapted to communicate with the second wireless gateway device; and
a third wireless user device located in a third region defined by extending lines from the first and the second walls, the third wireless user device being adapted to communicate with the first and the second wireless gateway devices.

24. The wireless communication network of claim 21, wherein:
the wireless communication obstacle comprises a first wall and a second wall joined to the first wall at an angle; and
the wireless communication devices comprise:
a first wireless user device and a first wireless gateway device located on a concave side of the wireless communication obstacle; and
a second wireless user device and a second wireless gateway device located on a convex side of the wireless communication obstacle.

* * * * *

UNITED STATES PATENT AND TRADEMARK OFFICE
CERTIFICATE OF CORRECTION

PATENT NO. : 8,346,245 B2  
APPLICATION NO. : 12/487670  
DATED : January 1, 2013  
INVENTOR(S) : Potkonjak Page 1 of 2

It is certified that error appears in the above-identified patent and that said Letters Patent is hereby corrected as shown below:

On the Title Page, in the Figure, for Tag "112", in Line 4, delete "107" and insert -- 106 --, therefor.

In the Drawings:

In Fig. 1, Sheet 1 of 5, for Tag "112", in Line 4, delete "107" and insert -- 106 --, therefor.

In Fig. 3, Sheet 2 of 5, delete "$R_6$" and insert -- R6 --, therefor.

In Fig. 3, Sheet 2 of 5, delete "$R_1$" and insert -- R1 --, therefor.

In Fig. 3, Sheet 2 of 5, delete "$R_2$" and insert -- R2 --, therefor.

In Fig. 3, Sheet 2 of 5, delete "$R_5$" and insert -- R5 --, therefor.

In Fig. 3, Sheet 2 of 5, delete "$R_4$" and insert -- R4 --, therefor.

In Fig. 3, Sheet 2 of 5, delete "$R_3$" and insert -- R3 --, therefor.

In the Specification:

In Column 2, Line 67, delete "102" and insert -- 102. --, therefor.

In Column 3, Line 1, delete "2-dimentional (2D) or 3-dimentional (3D)" and insert -- 2-dimensional (2D) or 3-dimensional (3D) --, therefor.

In Column 5, Line 10, delete "signals" and insert -- signals. --, therefor.

In Column 6, Line 4, delete "517," and insert -- 516, --, therefor.

Signed and Sealed this  
Eleventh Day of June, 2013

Teresa Stanek Rea  
*Acting Director of the United States Patent and Trademark Office*

CERTIFICATE OF CORRECTION (continued)
U.S. Pat. No. 8,346,245 B2

In the Claims:

In Column 10, Line 14, in Claim 1, delete "comprising" and insert -- comprising: --, therefor.

In Column 10, Line 29, in Claim 2, delete "comprising" and insert -- comprising: --, therefor.

In Column 10, Line 36, in Claim 3, delete "correspond to" and insert -- correspond to: --, therefor.

In Column 11, Line 31, in Claim 10, delete "comprises" and insert -- comprises: --, therefor.

In Column 11, Line 38, in Claim 11, delete "comprising" and insert -- comprising: --, therefor.

In Column 11, Line 67, in Claim 13, delete "comprise" and insert -- comprise: --, therefor.

In Column 12, Line 44, in Claim 18, delete "configured to" and insert -- configured to: --, therefor.